Oct. 4, 1938. J. M. G. FULLMAN Re. 20,873
CONNECTER FOR ELECTRICAL CONDUITS
Original Filed July 26, 1928
Fig. I.
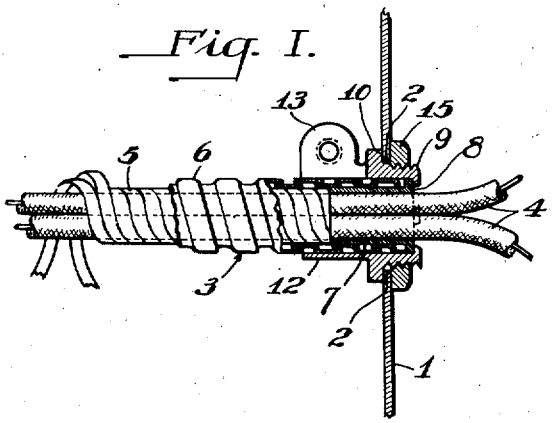
Fig. II.
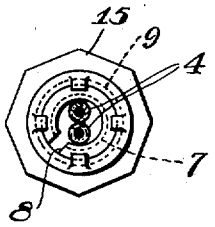
Fig. III.
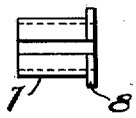
Fig. IV.
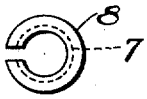
Fig V
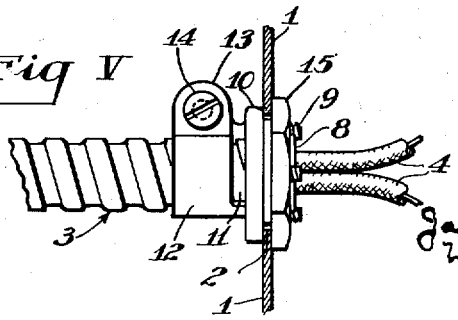
WITNESS
A. B. Wallace.
INVENTOR
James M. G. Fullman
by Christy & Christy,
Attys.

Reissued Oct. 4, 1938

Re. 20,873

UNITED STATES PATENT OFFICE 20,873

CONNECTER FOR ELECTRICAL CONDUITS

James M. G. Fullman, Sewickley, Pa., assignor, by mesne assignments, to National Electric Products Corporation, a corporation of Delaware Original No. 1,769,947, dated July 8, 1930, Serial No. 295,550, July 26, 1928. Application for reissue July 20, 1938, Serial No. 220,397

3 Claims. (Cl. 247—25)

In connecting electrical conduits and armored cables to outlet boxes and other electrical fittings it is usual to cut away the conduit wall or the sheath of the cable and to pass the unsheathed conductors into the box for making the desired electrical connections. In the use of metallic conduits, and particularly in the case of so-called flexible metallic armored cable, this leaves a more or less ragged metallic edge which often abrades or cuts into the insulation on the exposed conductors, and is likely to cause short circuits and other injurious effects.

In order to shield the exposed conductors from the edge of the cut-away metallic armor it has been proposed recently to provide a bushing of insulating material which can be slipped over the exposed conductors where the armor is cut away, or slipped between the conductors and the armor of a cable, and having a shoulder bearing against the sharp metallic edge of the armor, as shown and described in Letters Patent No. 1,687,013, dated October 9th, 1928. When such a bushing is used at the joint between an armored cable and an outlet box with connecters of the present usual types, it is largely or altogether hidden within the connecter because the end of the connecter overhangs the bushing, so that its presence is not apparent to an inspector or other observer.

The present invention provides an improved connecter binding the cable to the outlet box, and having means for holding the insulating and protective bushing in place, which will permit the bushing to be visible, and thus permit ready inspection of the system.

An object of the invention is to construct a new and novel combination of armored cable or conduit, a thin walled bushing, a connecter having inwardly projecting means which bears upon and overhangs the bushing, and said connecter having inspection openings so that the bushing is visible through an inspection opening when the combination is assembled within a box hole.

In the accompanying drawing Figure 1 is a sectional elevation of an outlet box wall with the combination of an armored cable provided with an insulating bushing in its throat and joined to an outlet box by my improved connecter.

Figure 2 is a front elevation of the structure shown in Figure 1.

Figure 3 is a view of the bushing in elevation.

Figure 4 is a front view of the bushing.

Figure 5 is a view of the box wall in section and with the cable and connecter, in elevation, secured in the box hole as shown in Figure 1.

The wall of the outlet box is designated by the numeral 1, and the usual outlet opening by the numeral 2. The flexible armored cable 3 herein shown is of the well known type. The conductors 4 have wound upon them a jacket 5 of helically coiled strips of fibrous material, such as paper, and the metallic armor 6 is coiled tightly around the jacketed conductors. When the edge of the armor 6 has been cut away, the jacket 5 is unwound for a suitable distance and broken off, thus leaving an annular space around the conductors within the armored cable back of the cut-away edge. Into this space there is slipped around the conductors the split tubular bushing 7 formed of thin insulating material and having at its outer edge the integral shoulder 8 which bears against the cut-away edge of the armor, leaving the exposed conductors 4 projecting therefrom.

The connecter may be of a variety of suitable forms, but for purposes of illustration I have shown herein the usual pinch connecter having a forward cylindrical threaded portion 9 projecting through the opening in the outlet box, with the shoulder 10 bearing against the outer face of the wall of the box, the transverse slit 11, and the rearwardly projecting bifurcated barrel portion 12 having the opposite ears 13 connected by the binding screw 14, by means of which the bifurcated barrel portion is caused to pinch the armored cable tightly. The bifurcated barrel portion 12, ears 13, and binding screw 14 are illustrative of any means for securing a cable or conduit within the barrel portion of the connecter. The connecter is held in place in the opening by means of the lock nut 15 screwed upon the threaded inner portion 9 and bearing against the inner face of the wall of the box. The screw threads, shoulder at the end of the screw threaded portion 9, and the lock nut 15 are illustrative of any suitable means for securing the connecter within a box hole.

In order to retain the bushing in place in such a way that it will be visible to an observer, the connecter is provided at the inner edge of the portion 9 with a plurality of inwardly projecting fingers which overhang and bear upon the outer face of the shoulder 8 of the bushing, preventing its displacement, while at the same time the bushing between the fingers is readily visible to an inspector or other observer through the inspection openings between the fingers. The inspection opening may be of any suitable form so long as it renders the bushing visible for ocular inspection when the cable and connecter are assembled, such as in a box hole. In fact, as shown in Figures 1 and 5, the shoulder of the bushing projects slightly beyond the side edge of the lock nut 15, so that it can be seen from the side as well as from the front. This is of considerable practical advantage in the installation and inspection of electrical conduit systems of this type.

It will be understood that the specific form of the connecter may be varied, and it will also be understood that while the invention is of particular advantage in the use of flexible metallic armored cables, it may be used to advantage in the installation of electrical conduits of other forms. Since the metallic armor for flexible armored cables is in every sense a conduit for conductors, irrespective of the fact that the conductors and the armor are normally a unitary structure, the term conduit will be understood to apply both to the armor of flexible armored cable and to conduit not initially having conductors therein, but through which insulated conductors are adapted to be pulled after installation of the conduit system.

What is claimed is:

1. The combination with an armored cable, of a bushing of insulating material having a tubular barrel portion contained within the cable armor and a shoulder bearing against the end of the armor, and a connecter and means for securing it to the cable, said connecter having a portion projecting beyond the end of the cable armor and having inwardly projecting fingers adapted to bear upon the bushing shoulder and retain the bushing in place.

2. The combination with a conduit having insulated conductors therein, of a bushing of thin insulating material having a tubular barrel portion contained between the conduit and the conductors to shield the conductor insulation from the sharp edges of the conduit, and a shoulder bearing against the end of the conduit, and a connecter and means for securing it to the conduit, said connecter having a portion projecting beyond the end of the conduit and having inwardly projecting means adapted to overhang and bear upon the bushing shoulder and retain the bushing in place, and said connecter having at least one inspection opening through the projecting portion of the connecter which renders the bushing visible when the combination is assembled in a box hole.

3. In an assembly of an outlet box, cabinet, panel or the like having an outlet hole in the wall thereof and a conduit having insulated conductors therein, a bushing of thin insulating material having a tubular barrel portion contained between the conduit and the conductors to shield the conductor insulation from the sharp edges of the conduit, and a shoulder bearing against the end of the conduit, in combination with a connecter having means for securing it in an outlet hole and means for securing it to the conduit, said connecter also having a portion projecting beyond the end of the conduit and having inwardly projecting means adapted to overhang and bear upon the bushing shoulder and retain the bushing in place, and said connecter having at least one inspection opening through the projecting portion of the connecter which renders the bushing visible when the combination is assembled in an outlet hole.

JAMES M. G. FULLMAN.